US011065770B2

(12) United States Patent
Riedel

(10) Patent No.: US 11,065,770 B2
(45) Date of Patent: Jul. 20, 2021

(54) OPERATING DEVICE FOR A MANIPULATOR

(71) Applicant: KUKA Deutschland GmbH, Augsburg (DE)

(72) Inventor: Martin Riedel, Augsburg (DE)

(73) Assignee: KUKA Deutschland GmbH, Augsburg (DE)

(*) Notice: Subject to any disclaimer, the term of this patent is extended or adjusted under 35 U.S.C. 154(b) by 278 days.

(21) Appl. No.: 16/079,613

(22) PCT Filed: Feb. 21, 2017

(86) PCT No.: PCT/EP2017/053835
§ 371 (c)(1),
(2) Date: Aug. 24, 2018

(87) PCT Pub. No.: WO2017/144431
PCT Pub. Date: Aug. 31, 2017

(65) Prior Publication Data
US 2019/0054629 A1 Feb. 21, 2019

(30) Foreign Application Priority Data

Feb. 24, 2016 (DE) ..................... 10 2016 202 881.2

(51) Int. Cl.
*B25J 13/02* (2006.01)
*G05B 19/409* (2006.01)
(Continued)

(52) U.S. Cl.
CPC ............. *B25J 13/02* (2013.01); *B25J 13/065* (2013.01); *B25J 19/06* (2013.01); *G05B 19/409* (2013.01);
(Continued)

(58) Field of Classification Search
CPC .......... B25J 13/02; B25J 13/065; B25J 19/06; G05B 19/409; G05B 2219/35415;
(Continued)

(56) References Cited

U.S. PATENT DOCUMENTS 4,888,708 A * 12/1989 Brantmark ........... G05B 19/427
700/264
5,617,515 A * 4/1997 MacLaren ............. B25J 9/1656
414/5

(Continued)

FOREIGN PATENT DOCUMENTS

DE      102004060484 A1    6/2006

OTHER PUBLICATIONS

JRC Beginner's Guide, Motoman Instructions, dated Apr. 1, 2001, Yaskawa Electric Corporation, Seoul, Korea.

(Continued)

*Primary Examiner* — Jeff A Burke
*Assistant Examiner* — Kyle T Johnson
(74) *Attorney, Agent, or Firm* — Bachman & LaPointe, P.C.

(57) ABSTRACT

The present invention relates to an operating device for controlling or programming a manipulator. The manipulator has a plurality of degrees of freedom which are independent of each other. The operating device comprises a manual control lever which is configured to specify at least one two-dimensional movement of the manipulator. Preferably, the manual control lever is a joystick. The operating device also comprises an information display which is allocated to the manual control lever and comprises a plurality of independently controllable display segments. The operating device further comprises a control device which is configured to individually control the display segments of the information display.

20 Claims, 6 Drawing Sheets

(51) Int. Cl.
  *H01H 9/02* (2006.01)
  *B25J 13/06* (2006.01)
  *B25J 19/06* (2006.01)

(52) U.S. Cl.
  CPC . *H01H 9/0214* (2013.01); *G05B 2219/35415* (2013.01); *G05B 2219/35416* (2013.01); *G05B 2219/36157* (2013.01); *G05B 2219/36159* (2013.01); *G05B 2219/36162* (2013.01)

(58) Field of Classification Search
  CPC ........... G05B 2219/35416; G05B 2219/36157; G05B 2219/36159; G05B 2219/36162; H01H 9/0214
  See application file for complete search history.

(56) References Cited

U.S. PATENT DOCUMENTS

| | | | | |
|---|---|---|---|---|
| 7,403,837 | B2* | 7/2008 | Graiger | G05B 19/409 361/71 |
| 9,086,757 | B1* | 7/2015 | Desai | G06F 3/0416 |
| 9,948,837 | B1* | 4/2018 | Gartrell | H04N 5/2252 |
| 2004/0164960 | A1* | 8/2004 | Jacobus | B25J 9/1689 345/161 |
| 2006/0125785 | A1* | 6/2006 | McAlindon | G06F 3/0235 345/156 |
| 2007/0168061 | A1* | 7/2007 | Iefuji | G05G 1/02 700/83 |
| 2009/0079537 | A1* | 3/2009 | Seitz | G05B 19/406 340/5.2 |
| 2015/0066209 | A1* | 3/2015 | Som | G05B 19/409 700/264 |
| 2015/0097666 | A1* | 4/2015 | Boyd | G08B 21/18 340/517 |
| 2016/0297067 | A1* | 10/2016 | Kogan | B25J 13/06 |
| 2017/0212498 | A1* | 7/2017 | Laxhuber | A61B 17/00 |
| 2018/0235724 | A1* | 8/2018 | Nowatschin | B25J 13/082 |
| 2018/0345495 | A1* | 12/2018 | Aldridge | B25J 9/0081 |
| 2019/0054629 | A1* | 2/2019 | Riedel | B25J 13/065 |

OTHER PUBLICATIONS

English translation of International Search Report for PCT/EP2017/053835, dated Jul. 27, 2017.

* cited by examiner

OPERATING DEVICE FOR A MANIPULATOR

BACKGROUND

The present invention relates to an operating device for controlling or programming a manipulator, to a method for signaling manipulator information and to a manipulator system.

Manipulators, and in particular robots, are universally utilizable free-programmable handling devices. A manipulator can here have a plurality of axes which are movable independently from one another by way of corresponding drives (for example servomotors). In this way, the manipulator can adopt different poses or different configurations, for example to move a tool or workpiece to a specific position in space. A manipulator can here have a plurality of degrees of freedom in terms of its movement. These can describe the number of mutually independent, driven movements that the manipulator can perform in space relative to a fixed world coordinate system. The movability of the manipulator can thus be characterized in general by the number of the degrees of freedom it possesses.

A manipulator can follow an automated program sequence. The latter can be based on a previously programmed program sequence, which is provided to a corresponding controller. Said program sequence can describe the individual trajectory points to be traveled through or traveled to by the manipulator. Furthermore possible is a manual operation of the manipulator, in which the operator manually specifies the movement of the manipulator, hence manually moves the manipulator.

The movement of a manipulator can be manually specified by way of an operating device. The operating device can here for example take the form of a hand operating device, which is operated by an operator by hand. Such hand operating devices communicate in wire-bound or wireless fashion with the controller of the manipulator and thus constitute an interface between the operator and the controller of the manipulator. For example, it is possible using the hand operating device to move a single axis of the manipulator, or to directly specify a movement of the tool center point of the manipulator.

To this end, the hand operating device can have various input apparatuses, such as for example individual rotary knobs or buttons to specify a linear movement or a rotation. It is furthermore known to provide a joystick for inputting the control commands. A considerable disadvantage of such a joystick, however, is the lack of directionality. It is difficult for an operator to discern how the reference system of the joystick is linked to the current coordinate system of the manipulator. For example, if the joystick is moved forward, the manipulator could be inadvertently moved laterally. This is especially true if the hand operating device is held at different orientations, or if the hand holding it or the operator is switched. It is indeed possible to provide a fixed mark on the hand operating device to visualize the directionality, but, depending on the situation, this may be impractical.

It is therefore an object of the present invention to provide an operating device for a manipulator that at least partially eliminates the above-mentioned disadvantages. In particular, an operating device is intended to be provided, which considerably simplifies operation of a manipulator by allowing intuitive operation.

These and other objects which will become clear in the following description are achieved by way of an operating device as claimed in claim 1, a method as claimed in claim 11, and a manipulator system as claimed in claim 16.

SUMMARY

The present invention relates to an operating device for a manipulator. The operating device is particularly suitable for controlling or programming a manipulator. The operating device can be operated manually by an operator. For example, the operating device can be operated by the operator's hand. The operating device can be used to directly specify the movement of the manipulator or to define movements for a program sequence. The operating device can thus allow or support the control of the manipulator and can also be used for establishing program sequences. To this end, the operating device can be in communication with a corresponding controller of the manipulator and transmit movement specifications of the operator to the controller with the result that these instructions can be subsequently implemented by the controller.

In principle, the manipulator can have any desired form. The manipulator can preferably have a plurality of degrees of freedom which are independent from one another. For example, the manipulator can be moved in a two-dimensional plane. In this way, the manipulator can take the form of a mobile platform which can be moved via remote control by the operating device. The manipulator can furthermore also take the form of an articulated arm robot, wherein the operating device can be used to specify the movement of the tool center point.

The operating device comprises a hand control lever, which is set up to specify at least one two-dimensional movement of the manipulator. The hand control lever is here operable by hand by the operator. The hand control lever can be deflectable here to specify a desired movement. In this case, various deflection directions can correspond to various movement directions. By changing the angle of the deflection of the hand control lever, it is thus possible to change the movement direction. In addition to such deflections, the hand control lever can preferably also be rotated or be actuated by pushing and pulling. For example, the hand control lever can take the form of a control lever or a joystick. The hand control lever is preferably a 2D, 3D or 6D joystick. A 6D joystick can specify a movement of the manipulator in six degrees of freedom (for example with respect to three translational and three rotational degrees of freedom of movement). For example, the joystick can be a hand trackball or a space mouse. For example, it is possible using the hand control lever to perform the following input movements: a deflection in the x-direction (e.g. by displacing or tilting the hand control lever in a first, x-direction), a deflection in the y-direction (e.g. by displacing or tilting the hand control lever in a second, y-direction), a deflection about a rotational axis (e.g. by twisting the hand control lever about the vertical axis, which is orthogonal to the first, x-direction and the second, y-direction).

The operating device furthermore comprises an information indicator, which is assigned to the hand control lever. The information indicator can thus be provided at the operating device such that an operator directly links or associates the information indicator to/with the hand control lever. For example, the information indicator can be arranged in the direct vicinity of the hand control lever. The information indicator in this case is set up to visually signal manipulator information to an operator of the operating device. In general, the information indicator can comprise a display or lamp. In particular, the information indicator comprises a plurality of indicator segments which are actuable independently from one another, such as a plurality of lamps. These indicator segments can here be purposefully actuated to permit or implement the signaling. The indicator segments here at least partially surround the hand control lever. For example, the indicator segments can be provided on different sides of the hand control lever. The indicator segments can be individual LEDs, which can emit visible light of different wavelengths (e.g. red or green). Preferably by purposefully actuating the individual indicator segments, they can light up in different colors.

The operating device furthermore has a control device which is set up to individually actuate the indicator segments of the information indicator in order to signal the manipulator information. The control device can be furthermore in communication with a controller of the manipulator in order to receive manipulator information from the controller or in order to transmit the movement specification to the controller of the manipulator. This is preferably done by way of radio technology.

The operating device is thus characterized by a user friendly and intuitive operation, especially because the manipulator information is intuitively signaled to the operator. This is made possible in particular by way of the information indicator which is assigned to the hand control lever. Since the indicator segments, which are actuable independently from one another, at least partially surround the hand control lever, it is possible for example to highlight a specific deflection direction of the hand control lever by way of appropriately actuating the corresponding indicator segment which is situated in the deflection direction of the hand control lever. For example, it is thus possible to intuitively signal to the operator which deflection direction of the hand control lever corresponds to the x-movement axis of the manipulator. In another example, the deflection direction can also be specified directly using the hand control lever. To specify the direction, the hand control lever can be shifted in the desired direction or the hand control lever can be twisted about the vertical axis. When changing the coordinate system, for example when switching between the robroot, world, base, flange or tool coordinate systems, it is also possible by actuating the corresponding indicator segments to highlight the corresponding deflection direction of the hand control lever and in this way to signal the corresponding x-axis to the operator. As a consequence, the operator always knows the unique assignment of the coordinate directions of the operating device and of the manipulator.

The indicator segments preferably have the same form. Consequently, each indicator segment that at least partially surrounds the hand control lever can have the same form. The indicator segments are furthermore preferably provided uniformly around the hand control lever. For example, such an indicator segment can be provided in each of the four main deflection directions of the hand control lever (forward, backward, left, right). The operator can thus directly associate the indicator segments with a deflection direction of the hand control lever.

The indicator segments preferably surround the hand control lever on at least three sides. It is thus possible to signal information which can be associated with and linked to the corresponding deflection directions of the hand control lever that correspond to these three sides (e.g. left, forward, right).

The information indicator preferably surrounds the hand control lever in the manner of a ring. The indicator segments can thus be arranged on a ring shape around the hand control lever. This permits unique assignment of the deflection directions of the hand control lever and the signaled information. In principle, structures which are similar to rings are also possible, although a ring shape is preferred to allow easier association of the individual indicator segments with the hand control lever.

The information indicator preferably comprises a segmented light-emitting ring, wherein said light-emitting ring comprises the plurality of indicator segments. With particular preference, the information indicator takes the form of the segmented light-emitting ring. Said light-emitting ring can be purposefully actuated for example in finely segmented sections in order to signal the information. Additionally, a further light-emitting ring can also be used here as an ambience light ring, likewise for signaling the information. The finely segmented indicator segments of the light-emitting ring can be formed by a multiplicity of small LCDs. By purposefully changing the light transmissivity thereof, for example, the manipulator information can be purposefully signaled.

The indicator segments preferably continuously surround the hand control lever. The indicator segments can therefore be provided around the hand control lever without gaps, with the result that every two-dimensional deflection direction of the hand control lever can be purposefully designated by the information indicator. A person skilled in the art appreciates that the indicator segments, owing to their construction, do not need to be provided one next to the other perfectly without gaps. However, the indicator segments preferably substantially, or as much as possible, adjoin one another in order to surround the hand control lever in the shape of a ring, for example.

The operating device is preferably a 2D, 3D or 6D mouse. The hand control lever can here take the form of a joystick, with particular preference of a cap or ball joystick. In this regard, the operator can hold the operating device with one hand and tilt, turn, shift, pull, push and/or rotate the hand control lever with the other hand, for example to specify a desired movement. The hand control lever can here be placed on the operating device as a central element. By arranging the indicator segments around the hand control lever, the possible deflection directions of the hand control lever can be identified with information and be accordingly associated by the user.

The information indicator preferably comprises at least four, with further preference at least 8, with further preference at least 16, with further preference at least 32, with further preference at least 64 and with the highest preference at least 100 indicator segments. It is consequently possible, depending on the use, to signal the manipulator information with the desired fineness.

The operating device furthermore preferably has a location sensor and/or an orientation sensor. It is thus possible to ascertain a location and/or orientation of the operating device. An inertial sensor can also be provided. The control device is preferably furthermore set up to actuate the indicator segments of the information indicator while taking into account the ascertained location and/or ascertained orientation of the operating device. It is thus possible to establish how the operator holds the operating device in space, and the manipulator information can be appropriately signaled on that basis. For example, if the deflection of the hand control lever is directly linked to the deflection of the manipulator, that is to say the movement of the manipulator is to proceed in the same direction as the deflection direction of the hand control lever, it is possible for example using the indicator segments to signal the regions into which the hand control lever should not be deflected in order to prevent possible collisions. In particular, if the manipulator takes the form of a mobile platform, the collision risk can be reduced hereby.

Preferably an input ring is provided around the hand control lever. The latter is set up to be rotatably actuable in order to capture a user input. The input ring can be in the form of a "jog wheel." The input ring can be set up to be continuously actuable or actuable in steps by way of a latching mechanism, for example in order to capture a menu input or to allow the operator to provide a movement specification. Due to the arrangement of the input ring with the hand control lever and in particular with the information indicator, intuitive operation can thus be made possible.

The present invention furthermore relates to a manipulator system, having a manipulator with a plurality of degrees of freedom which are independent from one another, and an operating device for controlling or programming the manipulator in accordance with the present invention. The operating device can here communicate with a corresponding controller of the manipulator. Said communication can be wire-bound or wireless, and the controller can be provided at the manipulator or separately therefrom.

The present invention furthermore relates to a method for signaling manipulator information to an operator of an operating device in accordance with the invention. The method comprises providing the manipulator information, which is to be visually signaled to the operator of the operating device. For example, the manipulator information can be provided by a controller of the manipulator to the control device of the operating device. The method furthermore comprises actuating the indicator segments of the information indicator in order to visually signal the manipulator information. This actuation can be performed by way of the control device of the operating device.

The manipulator information preferably describes a direction of a coordinate axis of the manipulator. The indicator segments are then preferably actuated such that the direction of the coordinate axis is signaled to the operator. For example, an indicator segment can be actuated such that the operator associates the corresponding deflection direction of the hand control lever with the coordinate axis direction of the manipulator. The operator can preferably control or change the direction of the coordinate axis of the manipulator by operating the hand control lever. It is thus possible for example for the operator to establish which deflection direction of the hand control lever is to be linked to the x-coordinate axis direction.

The manipulator information preferably describes a current angle of an axis or a selected axis of the manipulator and one or more limit angles of said axis. The indicator segments are then preferably actuated in a manner such that the current angle of the axis and an admissible and inadmissible angle range of the axis are signaled to the operator. For example, the operator can hereby directly identify how far away a current axis angle of the manipulator is from a corresponding axis limit value. By operating the hand control lever, the operator can preferably control or change the current angle of the axis of the manipulator. For example, the current angle of the axis can be directly specified by way of a rotation of the hand control lever. By visually signaling the current axis value and the limit values, the operator can directly tell which inadmissible regions are to be avoided. These regions and the current angle are here dependent on the selected axis.

The manipulator information preferably describes a current orientation of the manipulator and an obstacle in the environment of the manipulator. For example, the current forward direction of a mobile manipulator can be indicated, and also the relative position of possible obstacles with respect to this forward direction. The current orientation can here be indicated relative to a current deflection of the hand control lever. The indicator segments are preferably actuated such that the current orientation of the manipulator and a region which is occupied or blocked by the obstacle are signaled to the operator. Preferably, a distance of the manipulator from the obstacle can also be signaled by way of the indicator segments. The operator can preferably control or change the current orientation of the manipulator by operating the hand control lever. In this case, the operator directly recognizes how the current orientation of the manipulator is to be specified so as to prevent possible collisions. The orientation can here comprise the movement direction of the manipulator. The operator can consequently use the operating device to directly control the direction of travel to prevent collisions.

The manipulator information can describe any information that is associated with the manipulator. The manipulator information can here preferably comprise or describe in particular at least one of the following: local and/or time information relating to the two-dimensional movement of the manipulator (e.g. specified movement direction of the tool center point), local and/or time information relating to an axis configuration of the manipulator (e.g. current axis angle), information relating to a parameter value and/or a parameter limit of the manipulator (e.g. speed limit of an axial movement), information relating to the coordinate or reference system of the manipulator (e.g. linking deflection direction of the operating device and x-axis direction of the manipulator), information relating to an axis limit of the manipulator (e.g. maximum axis angle), environment information relating to the manipulator (e.g. relative position of obstacles), information relating to a state of the manipulator (e.g. temperature, status information, error status etc.). The manipulator information can furthermore describe a coupling state between a manipulator and the operating device. A person skilled in the art appreciates that this list is not exhaustive and, depending on the use, different manipulator information can be signaled by way of the indicator segments. A person skilled in the art appreciates that the information indicator can also be used to signal information relating to the function or state of the operating device (e.g. battery status, radio link quality, emergency shut-off state, menu mode of the operating device etc.) to the operator.

BRIEF DESCRIPTION OF THE DRAWINGS

The present invention will be described in more detail below with reference to the attached FIGS. The same components are denoted here with the same reference signs. In the FIGS.

DETAILED DESCRIPTION

Figure 1:
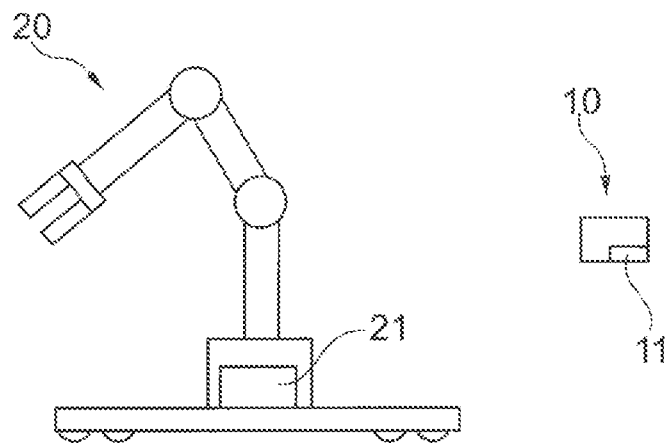
FIG. 1 shows a manipulator system in accordance with an embodiment.

FIG. 1 illustrates a manipulator system comprising a manipulator 20. The manipulator 20 is mobile here, which is to say it can be moved in space. To this end, the manipulator 20 is provided with a corresponding mobile platform. The manipulator 20 can furthermore control its axes to change its pose or its configuration. The movement of the manipulator 20 is here controlled by a controller 21, which is provided at the manipulator 20. The manipulator 20 can also be used in stationary fashion.

The manipulator system furthermore comprises an operating device 10, which can in particular take the form of a hand operating device. Said operating device 10 is set up to control the manipulator 20. To this end, the operating device 10 comprises a control device 11, which can detect user inputs and is in direct communication with the controller 21 of the manipulator. Due to this connection, information can be exchanged between the controller 21 of the manipulator 20 and the control device 11 of the operating device 10.

FIGS. 2-11 illustrate an operating device 10, which can correspond to the operating device 10 of FIG. 1. The construction of the operating device 10 of FIGS. 2-11 is uniform. The situations illustrated in FIGS. 2-11 mainly differ in terms of the signaled manipulator information within the present invention. The operating device 10 here comprises, with reference to FIG. 2, a handle 12 by which an operator can hold the operating device 10. The operating device 10 furthermore comprises a joystick 13 which is deflectable at least in the horizontal plane in order to specify movements of the manipulator 20. The joystick 13 can also be used to effect a data input or menu input on the operating device 10. Provided around the joystick is an information indicator 14 comprising a segmented light-emitting ring 15 and an ambience light ring 16. The individual segments of the light-emitting ring 15 are actuable independently from one another. The individual segments of the light-emitting ring 15 can furthermore emit light in different colors (e.g. green, yellow, red, blue). The ambience light ring 16 can also emit light as a whole in different colors (e.g. green, yellow, red, blue). Additionally provided on the operating device 10 is furthermore a display 17, at least one actuable switch 18 and an emergency stop 19.

Figure 2:
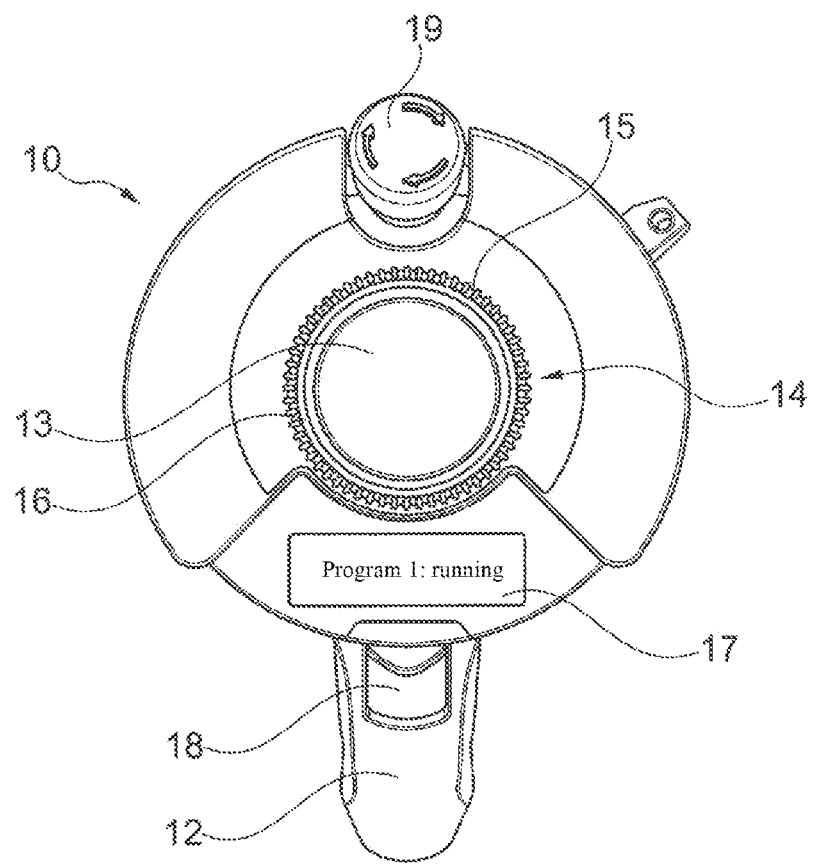
FIGS. 2-11 show an operating device in accordance with further embodiments.

In the situation illustrated in FIG. 2, no user input is being made. The manipulator 20 is located in its robot or manipulator cell, and the information indicator represents the status of the cell. To this end, each segment of the light-emitting ring 15 is actuated to emit green light, and the ambience light ring 16 also emits green light. The operator can see hereby that the cell is locked and not accessible. The operator can also gather from the green color that a program sequence is currently running without problems. In this regard, the display 17 can provide further information.

Figure 3:
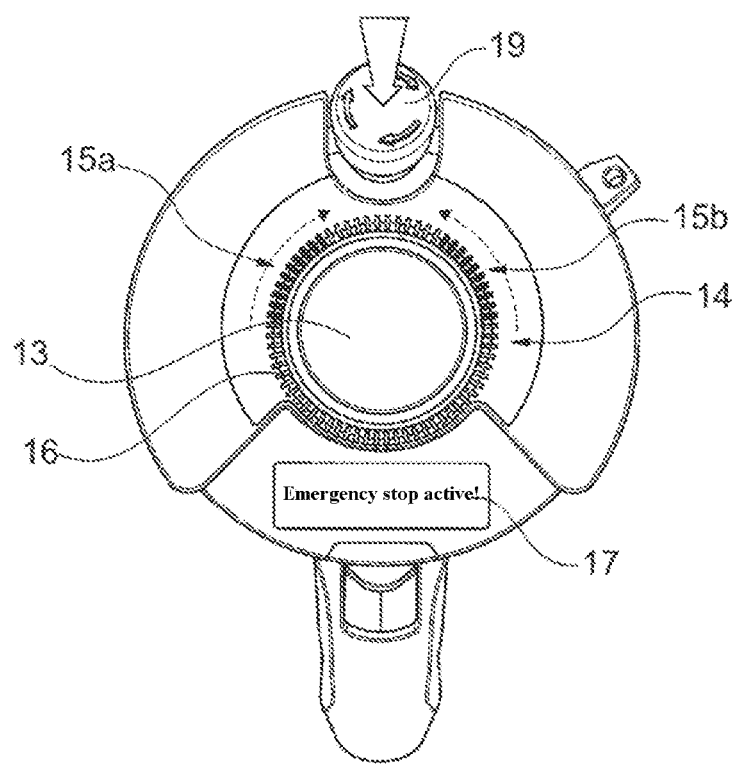

In the situation illustrated in FIG. 3, the emergency stop 19 has been pushed. As a reaction, the segments of the light-emitting ring 15 are actuated in a manner such that two regions of chasing lights 15a, 15b in yellow/red color indicate the depressed emergency stop 19. Furthermore, the ambience light ring 16 emits a red color. The display 17 furthermore indicates that the emergency stop has been activated.

Figure 4:
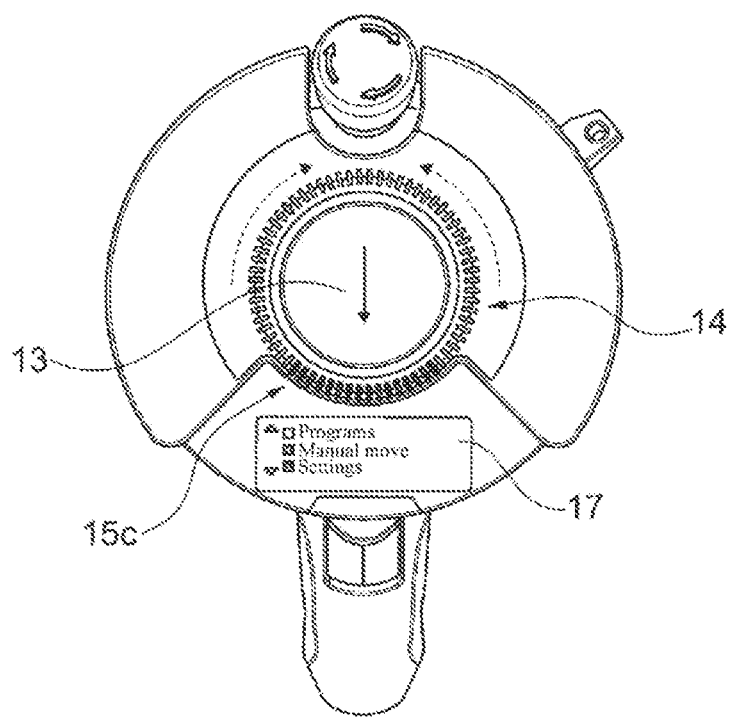

In the situation illustrated in FIG. 4, the information indicator is used to support a menu navigation of the operating device 10. In the present case, a menu is represented in the display 17, and the region 15c of the light-emitting ring 15 indicates that the joystick 13 is being deflected downward to navigate downward in the menu. The operator in this way receives immediate feedback to his input. It is furthermore also possible to indicate thereby that the joystick 13 is currently being used for menu navigation and not to effect a movement specification.

Figure 5:
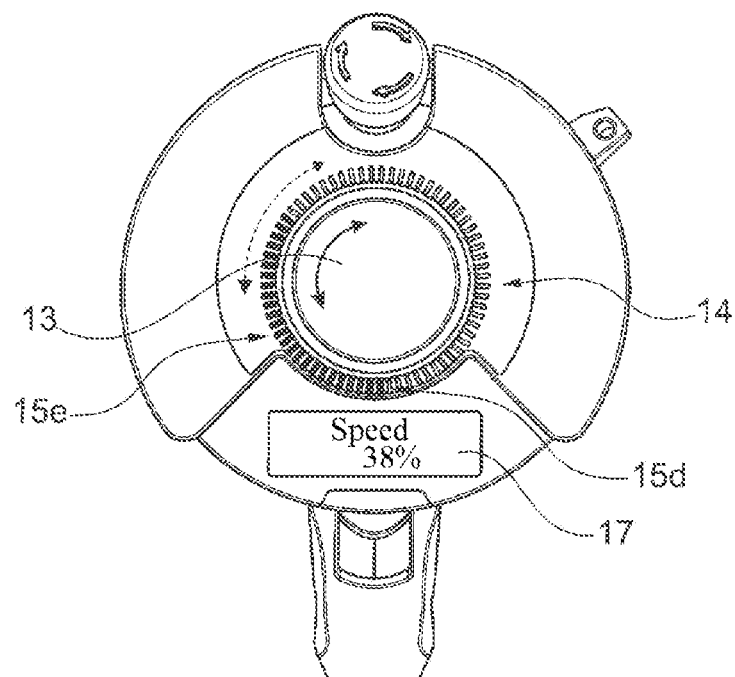

In the situation illustrated in FIG. 5, a parameter of the manipulator 20 is changed by turning the joystick 13 in accordance with the arrow direction illustrated. In the information indicator 14, a region 15e of the light-emitting ring lights up, which visualizes or signals the magnitude of the currently selected parameter. The region 15d, which is likewise visually highlighted on the light-emitting ring, gives the operator the boundaries of the region. In the present case, at least the position of the zero value of the parameter is represented thereby. As a consequence, the operator directly discerns that the currently selected parameter corresponds to approximately ⅓ of its maximum value. The display 17 furthermore represents the precise numerical value of the current parameter, e.g. "speed 38%."

Figure 6:
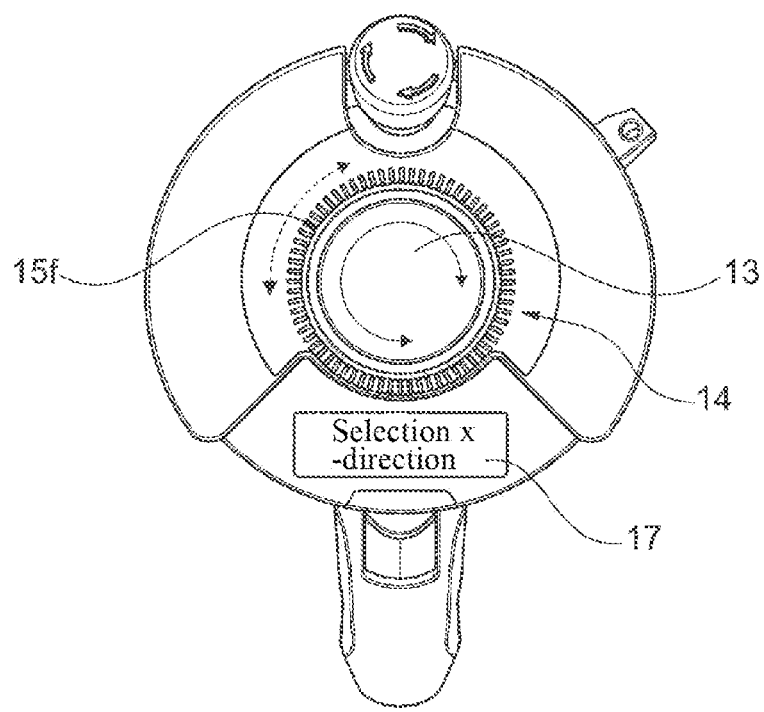

In the situation illustrated in FIG. 6, the manipulator 20 is to be moved manually in the base coordinate system. By turning the joystick 13 in accordance with the illustrated arrow direction, it is possible to select the deflection direction of the joystick 13 that is to correspond for example to the x-axis of the manipulator 20. When turning the joystick 13, a light-emitting segment 15f appears to move "in tandem" therewith due to the fact that the individual segments of the light-emitting ring 15 are correspondingly actuated. In this way, the operator can directly discern which deflection direction is currently selected and associated with the x-axis of the manipulator. By pressing the joystick 13, this unique axis assignment can be confirmed. This also defines the other spatial directions, with the z-axis being given as the vertical. The display 17 furthermore indicates that currently the x-direction is selected or set with the operating device 10.

Figure 7:
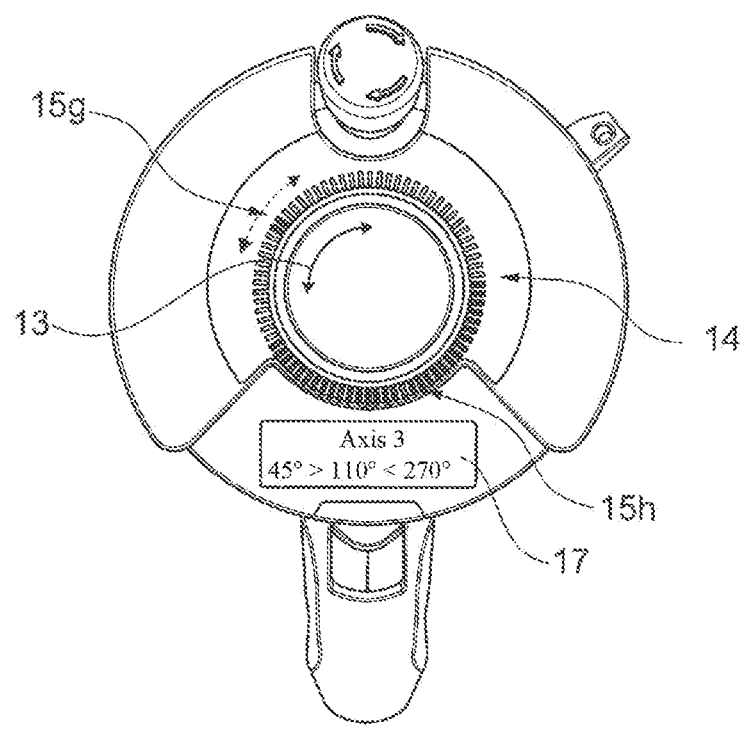

In the situation illustrated in FIG. 7, an individual axis of the manipulator 20 is intended to be moved or rotated. To this end, the joystick 13 is turned in accordance with the illustrated arrow direction, as a result of which the current axis angle of the individual axis changes. The illustrated region 15g of the information indicator 14 here indicates the current axis value, while the highlighted region 15h of the information indicator 14 indicates a prohibited axis region which can be bounded by individual axis limits. The operator thus immediately understands within which limits he may change the axis angle. In addition, the display 17 represents the numerical value of the current axis angle and the limits (e.g. 45°>110°<270°). Upon approaching the axis limits, it might be possible to issue an alert regarding a possible crossing of the axis limit by way of the information indicator additionally flashing.

Figure 8:
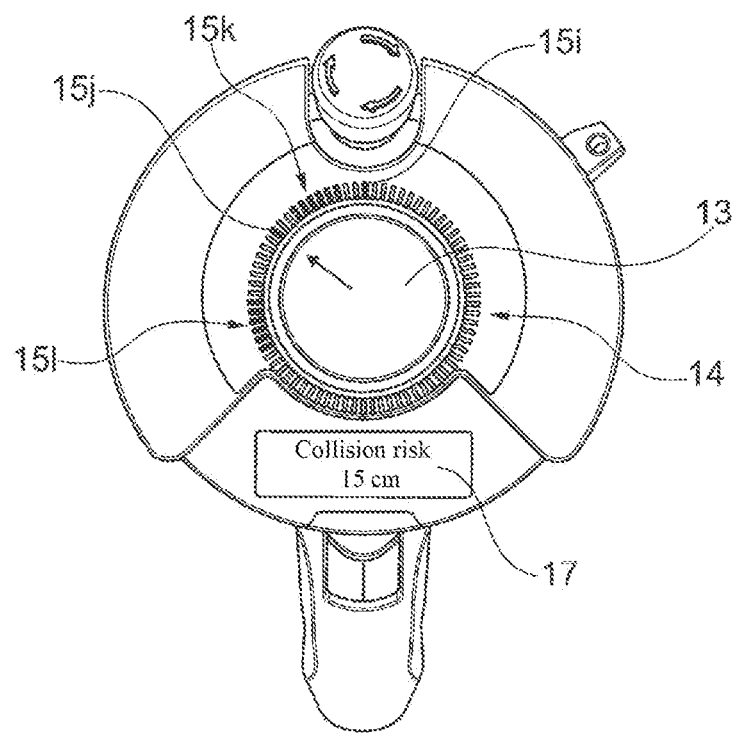

In the situation illustrated in FIG. 8, the mobile manipulator 20 is moved in space. By turning the joystick or moving the joystick 13, the desired direction of travel can be specified, which is represented visually by way of the segment 15j. The segment 15i at the same time indicates the current vehicle orientation. This can be indicated here relative to the joystick. In addition, the information indicator 14 indicates possible obstacles relative to the manipulator 20, which have been ascertained based on distance measurements by the manipulator. The region 15k here indicates a critical obstacle that is located to the left in front of the mobile manipulator. Due to the possible risk of collision, this region 15k is presented in red. Another region 15l furthermore shows in a green color a non-critical obstacle on the left next to the vehicle, for which there is no collision risk at the moment. No obstacles were identified for the right-hand side of the vehicle. The display 17 can here indicate the distance of the manipulator 20 from the critical obstacle, which in the present example is 15 cm. Alternatively, four regions could be actuated differently so as to reflect symbolically the environment of the vehicle. In the absence of a collision risk, every region can emit green light. If the color of one of the regions changes from emitting green via yellow to red light, and finally the region flashes, it is thus possible to signal that an obstacle has been identified and the risk of collision increases.

Figure 9:
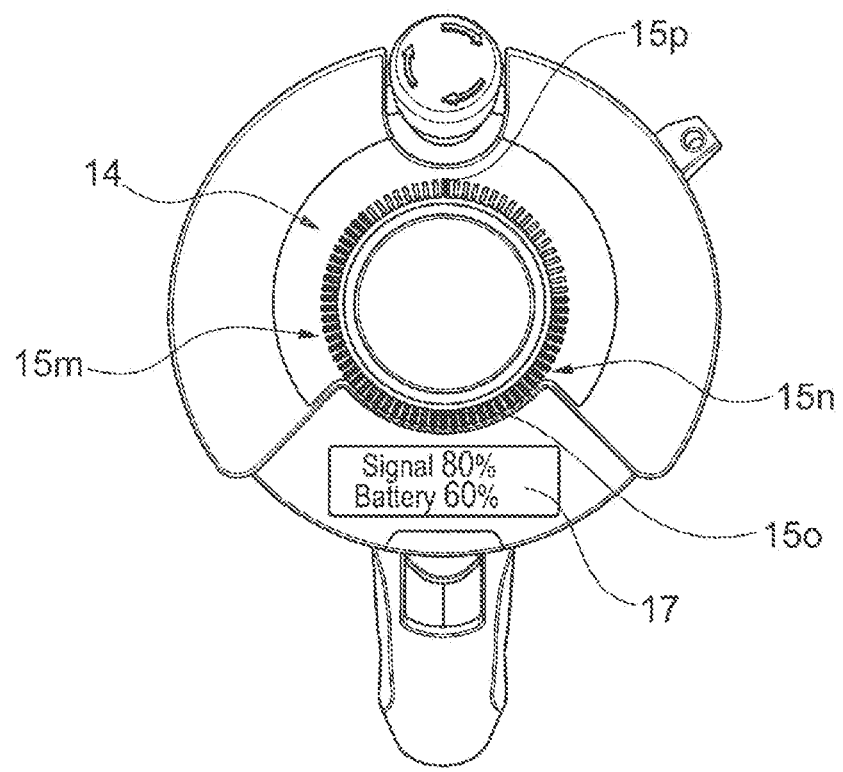

In the situation illustrated in FIG. 9, information relating to the battery status (e.g. of the operating device 10 or of the manipulator 20) and relating to the signal strength of the radio link is represented. In this case, the blue region 15m indicates the signal strength, while the yellow region 15n represents the current capacity of the battery. The white-light-emitting segments 15o and 15p indicate the minimum and maximum values, respectively, and optically separate the different pieces of information from each other. In addition, the respective numerical value (80% and 60%, respectively) is represented on the display 17.

Figure 10:
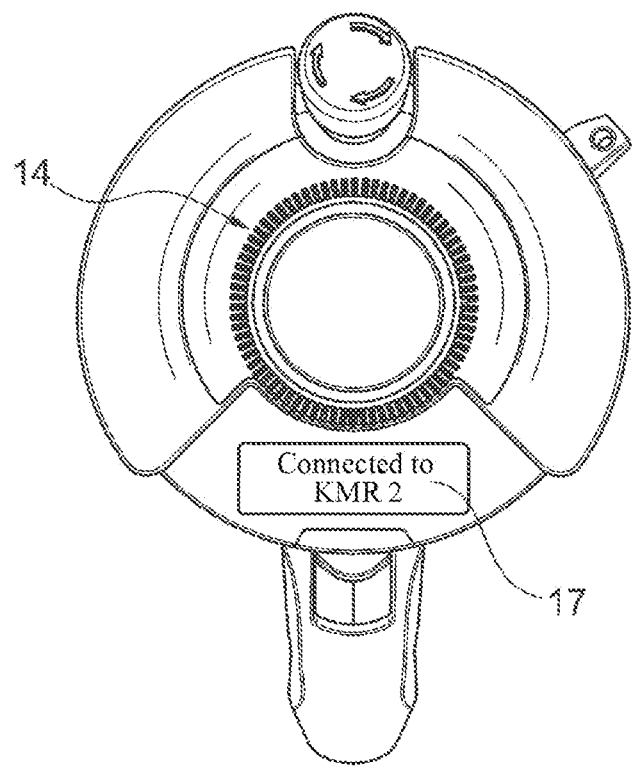

In the situation illustrated in FIG. 10, pairing monitoring is being effected. For example, by actuating the switch 18, a signal is transmitted to the currently assigned manipulator 20, with the result that the latter flashes. The flashing of the manipulator 20 is here in synchronization with a flashing of the information indicator 14, or of all segments of the light-emitting ring 15, with the result that the operator can see which manipulator is assigned to the operating device 10. The display 17 furthermore shows to which manipulator the operating device is connected ("connected to KMR 2").

Figure 11:
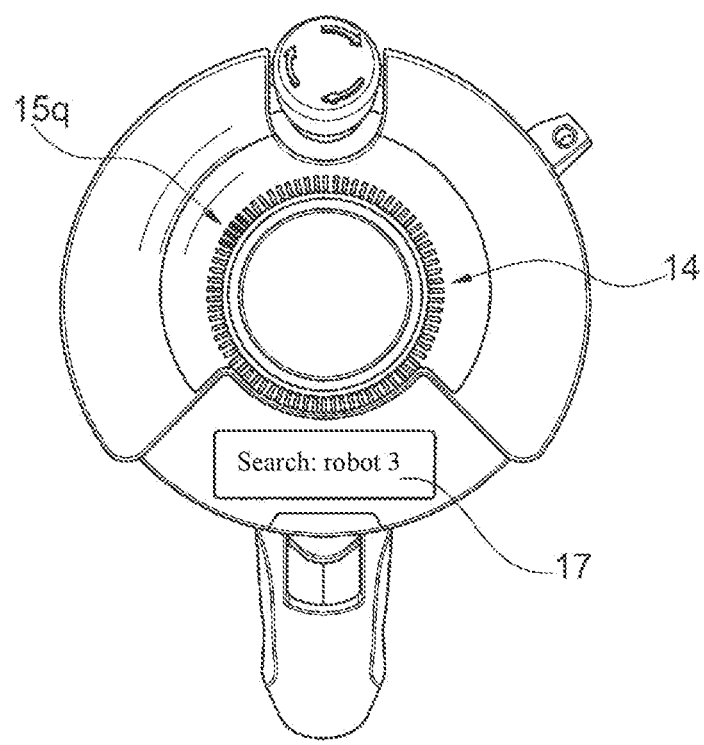

In the situation illustrated in FIG. 11, the information indicator 14 is used to indicate where the manipulator 20 is located relative to the operating device 10. To this end, the operating device 10 is equipped with a location and/or orientation sensor system. Taking into account this sensor data and corresponding local information of the manipulator 20, the region 15q of the light-emitting ring 15 is actuated such that the operator directly discerns where the manipulator 20 is located (in the present case: in front on the left, relative to the operating device).

Figure 12:
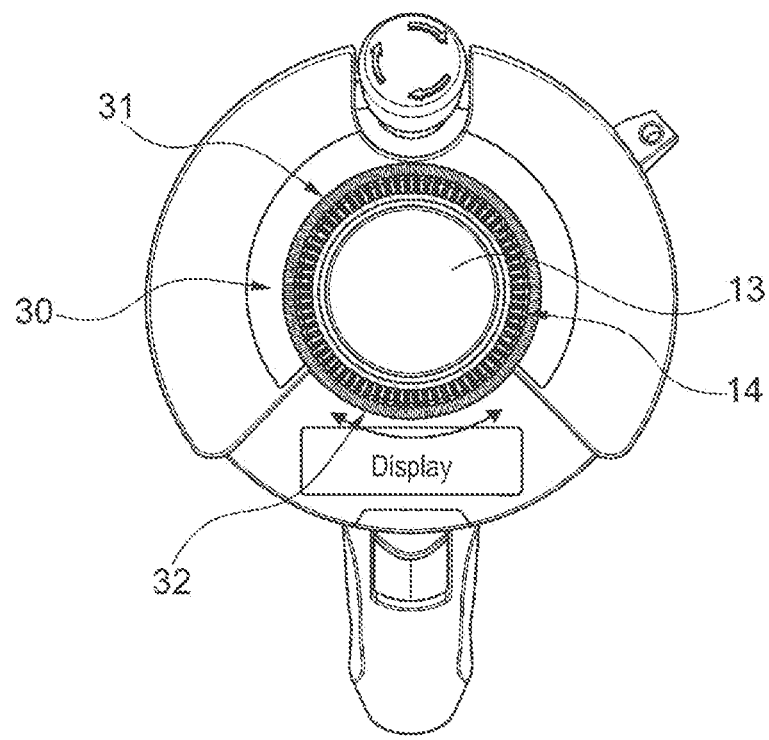
FIG. 12 shows an operating device in accordance with a further embodiment.

The operating device 10 illustrated in FIG. 12 is set up analogously to the operating device 10 which has been described with reference to FIG. 2, but additionally comprises an input ring 30. This input ring 30 is provided around the information indicator 14 with ambience light-emitting ring 16 and light-emitting ring 15 and around the joystick 13. By rotating the input ring 30, the user can perform an input, for example to control a menu navigation or a movement of the manipulator 20. The upper portion 31 of the input ring 30 is here recessed and not directly accessible by the operator. The lower portion 32 of the input ring 30 is open and is at least laterally accessible. A person skilled in the art appreciates that the operating device 10 illustrated in FIG. 12 can have each or any of the above described functions.

The present invention consequently makes possible a multiplicity of user-friendly and intuitive operating features, and the operating device 10 has an innovative central operating interface. Both the operating elements and the indicator elements are reduced into a compact unit and form the hub of interaction with the manipulator. Depending on the respective situation, the corresponding feedback is signaled to the operator.

LIST OF REFERENCE NUMERALS 10 operating device
11 control device
13 joystick
14 information indicator
15 light-emitting ring
16 ambience light ring
17 display
18 switch
19 emergency stop
20 manipulator
21 controller
30 input ring
31, 32 portion of the input ring

The invention claimed is:

1. A method for using an operating device (10) for controlling or programming a manipulator (20) having a plurality of degrees of freedom which are independent from one another, the operating device having:
   a hand control lever (13), which is set up to provide a first input to specify at least one two-dimensional movement of the manipulator (20);
   an information indicator (14) set up to visually signal manipulator information to an operator of the operating device (10), wherein the information indicator (14) comprises a plurality of indicator segments which are able to be actuated independently from one another and wherein the indicator segments at least partially surround the hand control lever (13);
   an input ring (30) around the hand control lever (13) and which is able to be rotatably actuated by the operator in order to capture a second input from said operator, the input ring (30) being laterally accessible to said operator to be rotated around the hand control lever by said operator to provide said second input; and
   a control device which is set up to individually actuate the indicator segments of the information indicator (14) to signal the manipulator information,
the method comprising:
   the operator controlling the current angle of the axis of the manipulator (20) by operating the hand control lever (13);
   actuating the indicator segments of the information indicator (14) to visually signal the manipulator information to the operator of the operating device (10);
wherein:
   the manipulator information describes a current angle of an axis of the manipulator (20) and a limit angle of said axis; and
   the indicator segments are actuated so that the current angle of the axis and an admissible and inadmissible angle range of the axis are signaled to the operator.

2. The method as claimed in claim 1, wherein the indicator segments are uniform and provided uniformly around the hand control lever (13).

3. The method as claimed in claim 1, wherein the indicator segments surround the hand control lever (13) on at least three sides.

4. The method as claimed in claim 1, wherein the information indicator (14) surrounds the hand control lever (13) in the manner of a ring.

5. The method as claimed in claim 1, wherein the information indicator (14) comprises a segmented light-emitting ring (15) which comprises the plurality of indicator segments, wherein the information indicator (14) furthermore comprises an ambience light ring (16).

6. The method as claimed in claim 1, wherein the indicator segments continuously surround the hand control lever (13).

7. The method as claimed in claim 1, wherein the operating device (10) is a 2D, 3D or 6D mouse, and/or wherein the hand control lever (13) is a joystick.

8. The method as claimed in claim 1, wherein the information indicator (14) comprises at least 32 indicator segments.

9. The method as claimed in claim 1, the operating device furthermore having a location sensor and/or an orientation sensor in order to ascertain a location and/or orientation of the operating device (10), and wherein the control device is furthermore set up to be able to actuate the indicator segments of the information indicator (14) while taking into account the ascertained location and/or orientation of the operating device.

10. The method as claimed in claim 1, wherein the manipulator information describes a direction of a coordinate axis of the manipulator (20), and wherein the indicator segments are actuated such that the direction of the coordinate axis is signaled to the operator,
the method further comprising the operator controlling the direction of the coordinate axis of the manipulator (20) by operating the hand control lever (13).

11. The method as claimed in claim 1 wherein the manipulator information describes a current orientation of the manipulator and an obstacle in the environment of the manipulator (20), and the indicator segments are actuated such that the current orientation of the manipulator (20) and a region which is occupied by the obstacle are signaled to the operator.

12. The method as claimed in claim 1, wherein the manipulator information comprises or describes at least one of the following:
local and/or time information relating to the two-dimensional movement of the manipulator (20),
local and/or time information relating to an axis configuration of the manipulator (20),
information relating to a parameter value and/or a parameter limit of the manipulator (20),
information relating to the coordinate or reference system of the manipulator (20),
information relating to an axis limit of the manipulator (20),
environment information relating to the manipulator (20),
information relating to a status of the manipulator (20).

13. The method as claimed in claim 1 further comprising:
said operator holding a handle (12) of the operating device with a first hand while operating the hand control lever with a second hand of said operator;
said operator depressing an emergency stop (19) stop on the operating device to stop the manipulator;
said operator laterally accessing an input ring (30) to be rotate the input ring around the around the hand control lever by said operator to provide input; and
a display (17) on the operating device displaying aphanumerical manipulator information.

14. A method for using an operating device (10) for controlling or programming a manipulator (20) having a plurality of degrees of freedom which are independent from one another, the operating device having:
a hand control lever (13) for operation by a hand of an operator to order to capture a first input from said operator and which is set up to specify at least one two-dimensional movement of the manipulator (20);
an input ring (30) around the hand control lever (13) and which is able to be rotatably actuated by the operator in order to capture a second input from said operator, the input ring (30) being laterally accessible to said operator to be rotated around the hand control lever by said operator to provide said second input;
an information indicator (14) set up to visually signal manipulator information to an operator of the operating device (10), wherein the information indicator (14) comprises a plurality of indicator segments which are able to be actuated independently from one another and wherein the indicator segments at least partially surround the hand control lever (13); and
a control device which is set up to individually actuate the indicator segments of the information indicator (14) to signal the manipulator information;
wherein:
an obstacle is in the environment of the manipulator (20), the method comprising:
displaying on the information indicator, a region which is occupied by the obstacle.

15. The operating device as claimed in claim 14 further comprising:
a handle (12) for said operator to hold the operating device with a first hand while operating the hand control lever with a second hand of said operator;
an emergency stop (19) stop depressable by said operator;
a switch (18) on the handle; and
a display (17) for displaying aphanumerical manipulator information.

16. A method for using an operating device (10) to controlling or program a manipulator (20) having a plurality of degrees of freedom which are independent from one another, the operating device having:
a hand control lever (13) for operation by a hand of an operator to order to capture a first input from said operator and which is set up to specify at least one two-dimensional movement of the manipulator (20);
an input ring (30) around the hand control lever (13) and which is able to be rotatably actuated by the operator in order to capture a second input from said operator, the input ring (30) being laterally accessible to said operator to be rotated around the hand control lever by said operator to provide said second input;
an information indicator (14) set up to visually signal manipulator information to an operator of the operating device (10), wherein the information indicator (14) comprises a plurality of indicator segments which are able to be actuated independently from one another and wherein the indicator segments are arranged in a ring to at least partially surround the hand control lever (13); and
a control device which is set up to individually actuate the indicator segments of the information indicator (14) to signal the manipulator information, the method comprising:
the operator providing the first input to the hand control lever; and
displaying on the information indicator via lighting the segments in different colors, a current value of a condition of the manipulator and additional information about the condition,
wherein:
the condition is an orientation; and
the additional information indicates an admissible or inadmissible range of the orientation.

17. An operating device (10) for controlling or programming a manipulator (20) having a plurality of degrees of freedom which are independent from one another, having:
a hand control lever (13) for operation by a hand of an operator to order to capture a first input from said operator and which is set up to specify at least one two-dimensional movement of the manipulator (20);
an input ring (30) around the hand control lever (13) and which is able to be rotatably actuated by the operator in order to capture a second input from said operator, the input ring (30) being laterally accessible to said operator to be rotated around the hand control lever by said operator to provide said second input;

an information indicator (14) set up to visually signal manipulator information to an operator of the operating device (10), wherein:
  the manipulator information is a current angle of an axis of the manipulator and an admissible or inadmissible angle range of the axis;
  the information indicator (14) comprises a plurality of indicator segments which are able to be actuated independently from one another; and
  the indicator segments at least partially surround the hand control lever (13); and a control device which is set up to individually actuate the indicator segments of the information indicator (14) to signal the manipulator information.

18. The device as claimed in claim 17, wherein the information indicator (14) comprises at least 32 indicator segments.

19. A method for using an operating device (10) to controlling or program a manipulator (20) having a plurality of degrees of freedom which are independent from one another, the operating device having:

a hand control lever (13) for operation by a hand of an operator to order to capture a first input from said operator and which is set up to specify at least one two-dimensional movement of the manipulator (20);

an input ring (30) around the hand control lever (13) and which is able to be rotatably actuated by the operator in order to capture a second input from said operator, the input ring (30) being laterally accessible to said operator to be rotated around the hand control lever by said operator to provide said second input;

an information indicator (14) set up to visually signal manipulator information to an operator of the operating device (10), wherein the information indicator (14) comprises a plurality of indicator segments which are able to be actuated independently from one another and wherein the indicator segments are arranged in a ring to at least partially surround the hand control lever (13); and a control device which is set up to individually actuate the indicator segments of the information indicator (14) to signal the manipulator information, the method comprising:

the operator providing the first input to the hand control lever; and displaying on the information indicator via lighting the segments in different colors, a current value of a condition of the manipulator and additional information about the condition wherein the condition is current angle of an axis of the manipulator and the additional information is an admissible or inadmissible angle range of the axis.

20. The method as claimed in claim 19, wherein the information indicator (14) comprises at least 32 indicator segments.

* * * * *